Patented Sept. 6, 1927.

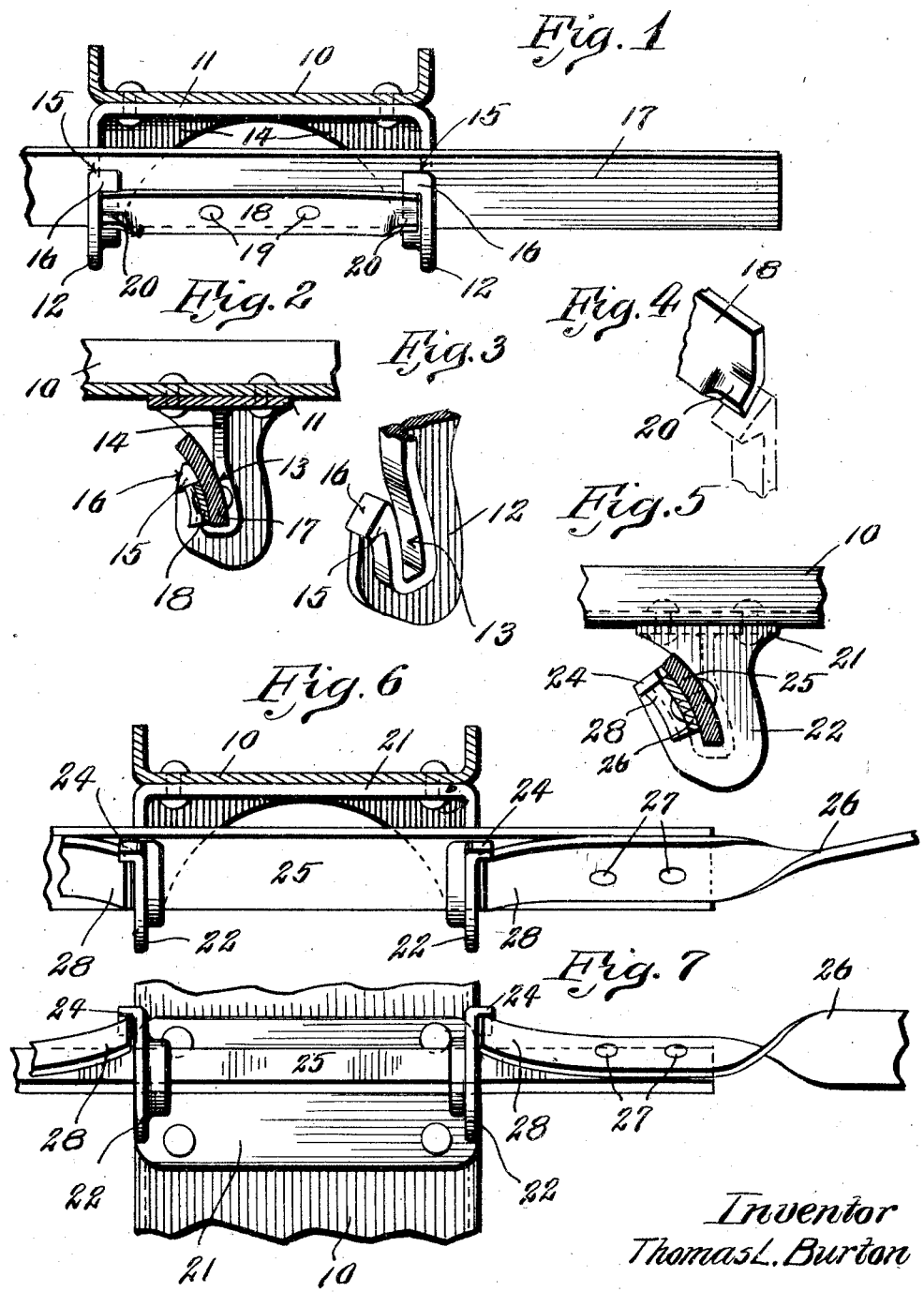

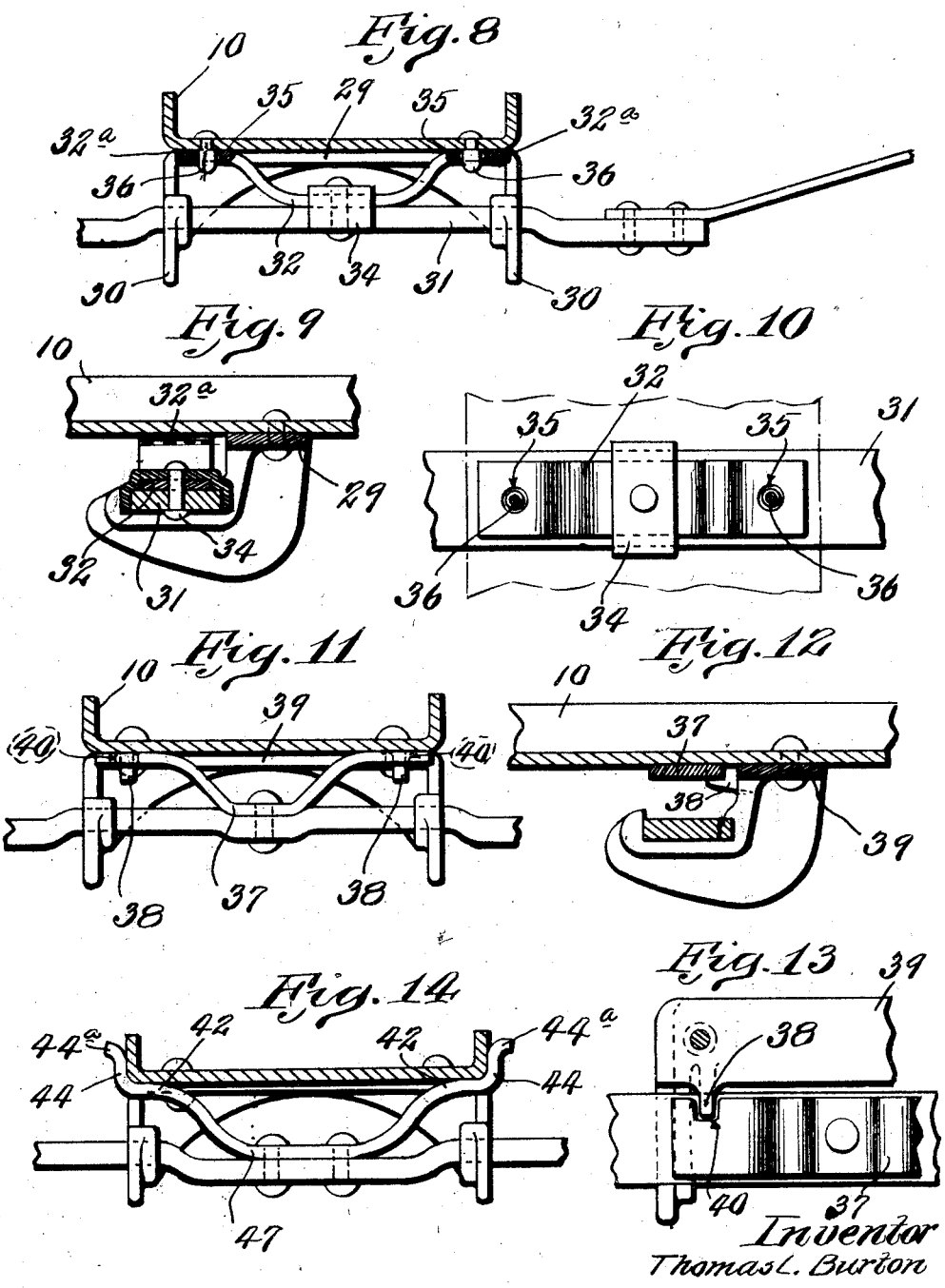

1,641,621

UNITED STATES PATENT OFFICE.

THOMAS L. BURTON, OF NEW YORK, N. Y.

MOUNT FOR BRAKE-BEAM SAFETY BARS.

Application filed November 1, 1924. Serial No. 747,171.

This invention relates to new and useful improvements in mounts for brake beam safety bars or supports, and the objects of the invention are to provide simple and efficient means for detachably attaching the safety bar in position on a car truck and to provide means for locking the safety bar in position against accidental displacement.

Further objects of the invention are to provide resilient means cooperating with said safety bar and a stationary part of a car truck for holding said bar to its seat under tension, thereby preventing vibration and play of said bar and eliminating rattling and other noises caused thereby.

Still further objects of the invention are to provide automatic means for interlocking the safety bar with a part of a car truck whereby said bar is secured against accidental movement in either vertical or horizontal directions, said means being manipulative for permitting easy removal of said bar when so desired.

With these and other objects in view, my invention consists in certain novel features of construction and arrangement of parts, hereinafter more fully described and claimed and illustrated in the accompanying drawings, in which—

Figure 1 is a side elevational view of the mount or bracket with the safety bar in position and showing the spring plank in transverse cross section.

Figure 2 is a vertical cross section taken transversely through Figure 1.

Figure 3 is a perspective detail view of one of the seats or hooks of the bracket.

Figure 4 is a perspective detail view of one end of the resilient member utilized for locking the safety bar in position.

Figure 5 is an end elevational view of a modified form of the bracket showing the safety bar in cross section.

Figure 6 is a front elevational view of the bracket shown in Figure 5.

Figure 7 is a bottom plan view of the bracket and parts associated therewith.

Figure 8 is a side elevational view of a still further modified form of bracket or mount.

Figure 9 is a vertical cross section taken transversely through said bracket and the safety bar supported therein.

Figure 10 is a top plan view of the safety bar and its resilient locking member.

Figure 11 is a side elevational view of a still further modified form of mount.

Figure 12 is a vertical cross section taken transversely through Figure 11.

Figure 13 is a fragmental top plan view of the bracket and the safety bar carried thereby.

Figure 14 is a side elevational view of a still further modified form of mount.

In the construction of railway car brake rigging, safety bars are generally used to serve either as safety elements and catch and support a brake beam and prevent its dropping in case the supporting elements thereof fail or said safety bars are used as third or fourth point supports or for both purposes. The safety bar is generally secured to the spring plank and extends transversely therefrom under the respective brake beams.

It is the purpose of the present invention to provide simple means for removably attaching the safety bar in positon and to provide automatic means for interlocking said bar and said spring plank or part thereof and hold said bar against displacement and prevent vibration and rattling thereof.

Referring by numerals to the accompanying drawings, and particularly to Figures 1 to 4, 10 indicates a spring plank or other part of a car truck to which is secured a bracket or mount 11 having downwardly extending hook portions 12 provided with upwardly disposed slots or seats 13 which are slightly inclined or curved outwardly. A longitudinally disposed rib or web 14 extends between hook portions 12 and reinforces said bracket. The extreme upwardly presented end of each hook 12 is provided with a lug 15 which extends inwardly of said bracket and longitudinally of said seat and is provided with a downwardly and outwardly inclined face 16.

The safety bar 17 is adapted to enter and rest in slots or seats 13 and has its ends projecting outwardly under the respective brake beams, not shown. A resilient member or spring 18 is fixed to bar 17 by rivets 19 and has its ends, when bar 17 is in position in bracket 11, terminating adjacent to hooks 12 and engaging the underside of lugs 16 as shown in Figure 1. Thus member 18 holds bar 17 against longitudinal movement by virtue of having its ends abutting the hook portions 12 and said bar is held against movement in a vertical plane by member 18 due to the fact that the upper edges of the ends thereof strike against the undersides of the inwardly presented lugs 15. The lower ends of the ends of member 18 are bent or deflected outwardly as indicated at 20 in order to facilitate the positioning of bar 15 in the bracket. In placing the bar in position, the deflected portions 20 clear the upper portions of lugs 15 and when the straight portions of the ends of member 18 engage the inclined or cam faces 16 of lugs 15 they yield and ride over said lugs and when bar 17 is in its home position the upper edges of the ends of member 18 are clear of lugs 15 and spring to their normal positions and come to rest under said lugs and bear against the inwardly presented flanges of hooks 12. In this manner, the safety bar is held against movement in all directions and the tensioned ends of spring 18 press against said flanged portions of said hooks and prevent vibration and play of bar 17.

To remove the bar from the bracket, it is necessary to force the ends of spring 18 outwardly until their upper edges are clear of lugs 15 whereupon bar 17 may be lifted out of the seats in bracket 11.

In Figures 5 to 7 a modified form of bracket and safety bar is shown wherein a bracket 21 is provided with hook portions 22 having outwardly and longitudinally presented lugs 24 at their upper ends. A safety bar or support 25 engages the seats formed in said hook portions and carries at each end a yielding track member 26 forming a third or fourth point support for brake beams. This track member is attached to the safety bar by means of rivets or other fastening devices 27 and the inner ends 28 of said track member are slightly curved away from bar 25 and terminate immediately adjacent to the hook portions 22. The upper edge of each end 28, when bar 25 is in position, rests against the underside of the respective lug 24, and thereby locks said bar against removal from the bracket 21 while the ends 28 abutting hook portions 22 prevent the longitudinal movement of bar 25.

The form shown in Figures 8 to 10 comprises a bracket 29 provided at its ends with depending arms 30 having horizontally disposed seats in which rest a safety bar 31. A leaf spring 32 is secured at 34 to bar 31 and curves upwardly and has its ends 32ᵃ bearing against the underside of the spring plank so that bar 31 is yieldingly held to its seat and is locked against movement in a vertical plane. To prevent the longitudinal movement of said bar the ends 32ᵃ of spring 32 are provided with apertures or recesses 35 which, when the bar is in proper position, receive projections or pins 36 formed on and depending from the spring plank. In consequence the bar 31 is locked against movement in all directions.

In the form shown in Figures 11 to 13, a spring 37 is carried by the safety bar and presses against the underside of the spring plank and holds its safety bar to its seats in a bracket 39. Said spring is held against longitudinal movement by means of fingers 38 projecting laterally from bracket 39 and engaging recesses or notches 40 formed in the inner side of spring 37.

The form shown in Figure 14 discloses a safety bar provided with a spring 41 which has horizontally disposed portions 42 yieldingly bearing against the underside of the spring plank, thereby holding said bar to its seats in the bracket and the ends of said spring are bent upwardly as indicated at 44 and press against the sides or flanges of said spring plank and thus lock said safety bar against longitudinal movement. Ends 44 are slightly curved outwardly as indicated at 44ᵃ in order to facilitate the positioning of spring 47 relative to a spring plank.

I claim:

1. In a car construction, the combination of a bracket, a brake beam safety bar removably seated therein, an overhanging projection on said bracket, and a resilient member carried by said bar and yieldingly holding said bar against movement in vertical or lateral directions and adapted to engage said stationary projection and lock said bar against accidental movement.

2. In a car construction, the combination with a part of a truck, of a bracket secured thereto, a brake beam safety bar and support detachably seated therein, and a resilient member fixed to said bar and yieldingly holding the latter against movement in a vertical plane and a stationary member projecting in the path of said resilient means, having engagement therewith for locking said bar against movement in a horizontal plane.

3. In a car construction, the combination with a car truck part, of a bracket secured thereto and provided near its ends with depending extensions, having formed therein laterally opening seats, a brake beam safety bar and support detachably seated in said extensions and a spring member fixed intermediate its ends to said bar and having its ends in engagement with a stationary part for locking said bar against movement in longitudinal and lateral directions.

4. In a car truck construction, the combination of a bracket adapted to be secured to a car truck part and provided with laterally opening seats, a safety bar movable laterally into and out of position in said seats, and a resilient member carried by said bar and adapted to engage a stationary part for holding said bar against displacement from said seats.

5. In a car construction, the combination with a car truck element, of a bracket element secured thereto, extensions depending from said bracket and provided with laterally opening seats, a safety bar movable laterally into and out of engagement with said seats, and a resilient member secured to said bar and engageable by one of said elements to lock said bar against longitudinal and lateral movements.

6. In a car truck construction, the combination of a car truck part, a bracket secured thereto, lugs depending from said bracket and provided with upwardly disposed and laterally opening seats, a safety bar arranged in said seats and laterally removable therefrom, and a resilient member engaging said bar and having its ends in engagement with said truck part or said bracket for locking said bar against movement in the direction of the openings of said seats.

7. In a car truck construction, the combination of a car truck part, a bracket secured thereto, lugs depending from said bracket and provided with upwardly disposed and laterally opening seats, a safety bar arranged in said seats and laterally removable therefrom, a resilient member secured to said bar and bearing against said bracket for holding said bar against vertical movement and interengaging said resilient member with said bracket for locking said member and said bar against longitudinal movement.

8. In a car truck construction, the combination of a car truck, a bracket secured to said truck part, downwardly depending extensions formed integral with said bracket and provided with horizontally disposed seats open at the top, a safety and support bar removably arranged in said seats, and a leaf spring fixed to said bar and bearing against a stationary part for maintaining said bar under tension to its seat.

In testimony whereof I hereunto affix my signature this 22nd day of October, 1924.

THOMAS L. BURTON.